United States Patent Office 3,438,185
Patented Apr. 15, 1969

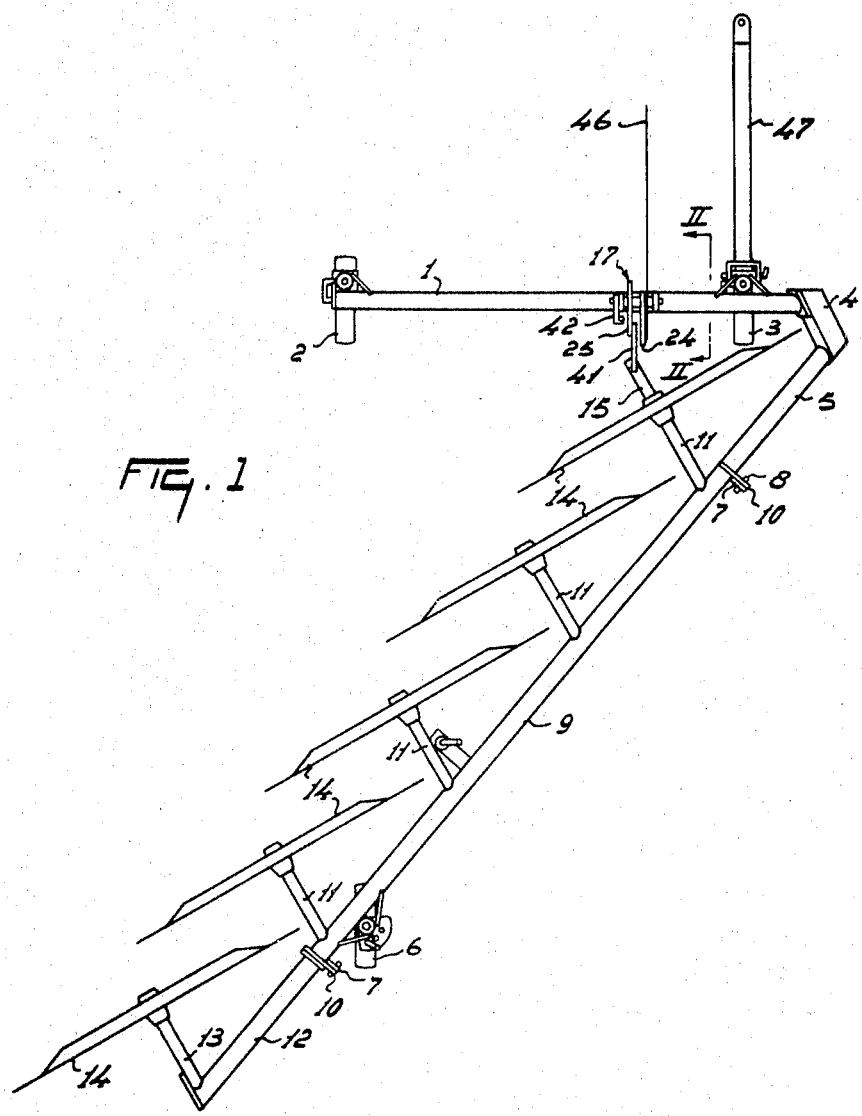

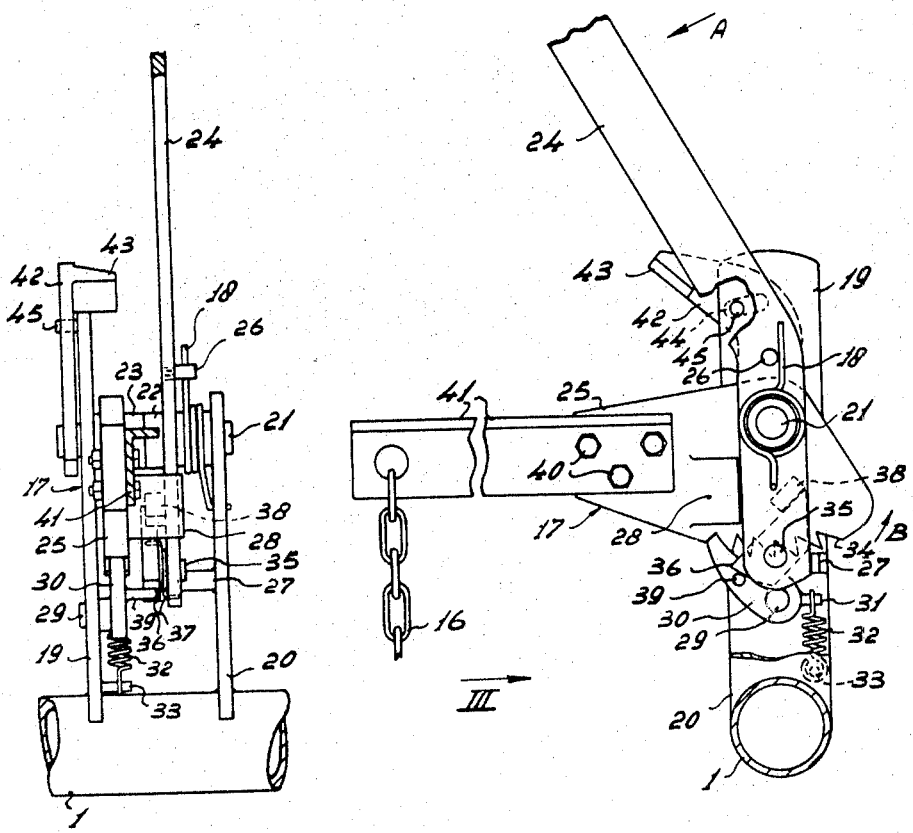

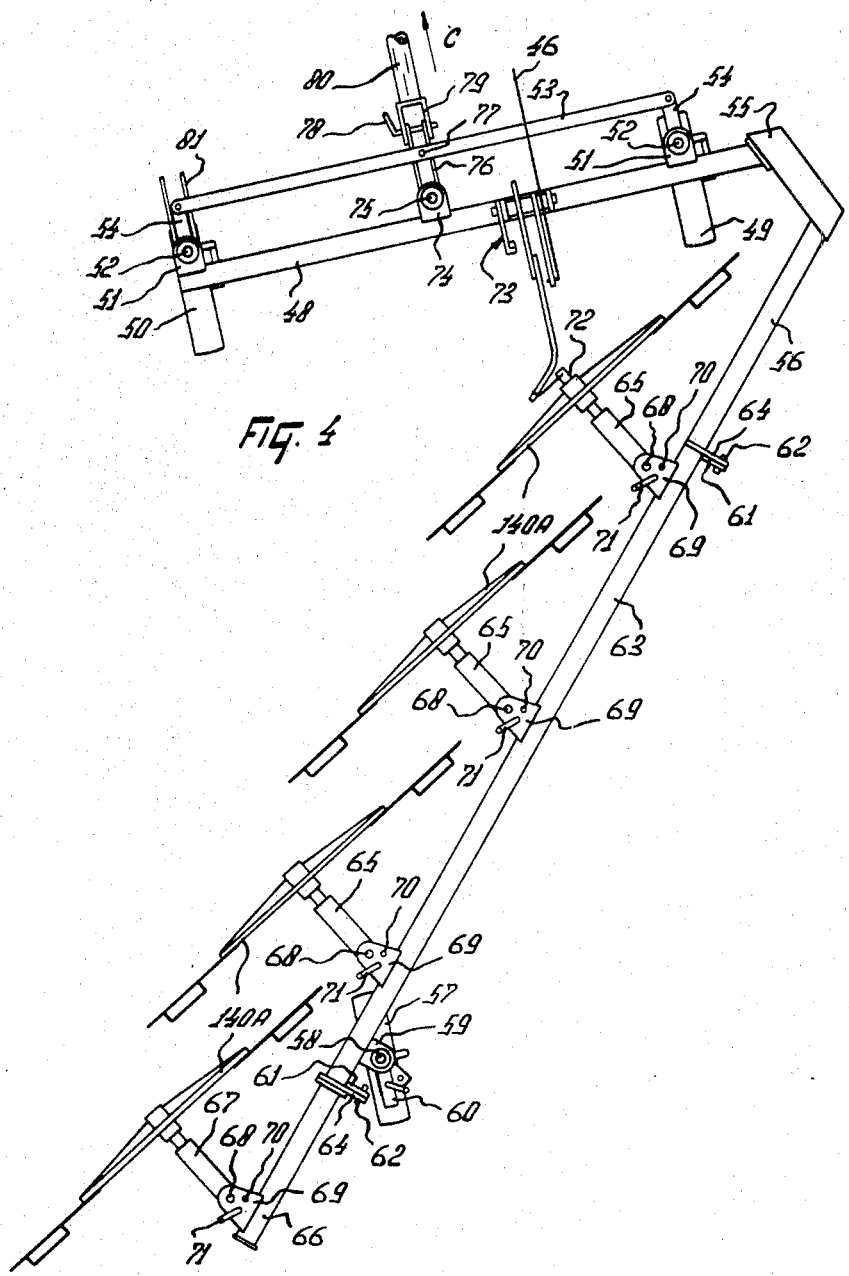

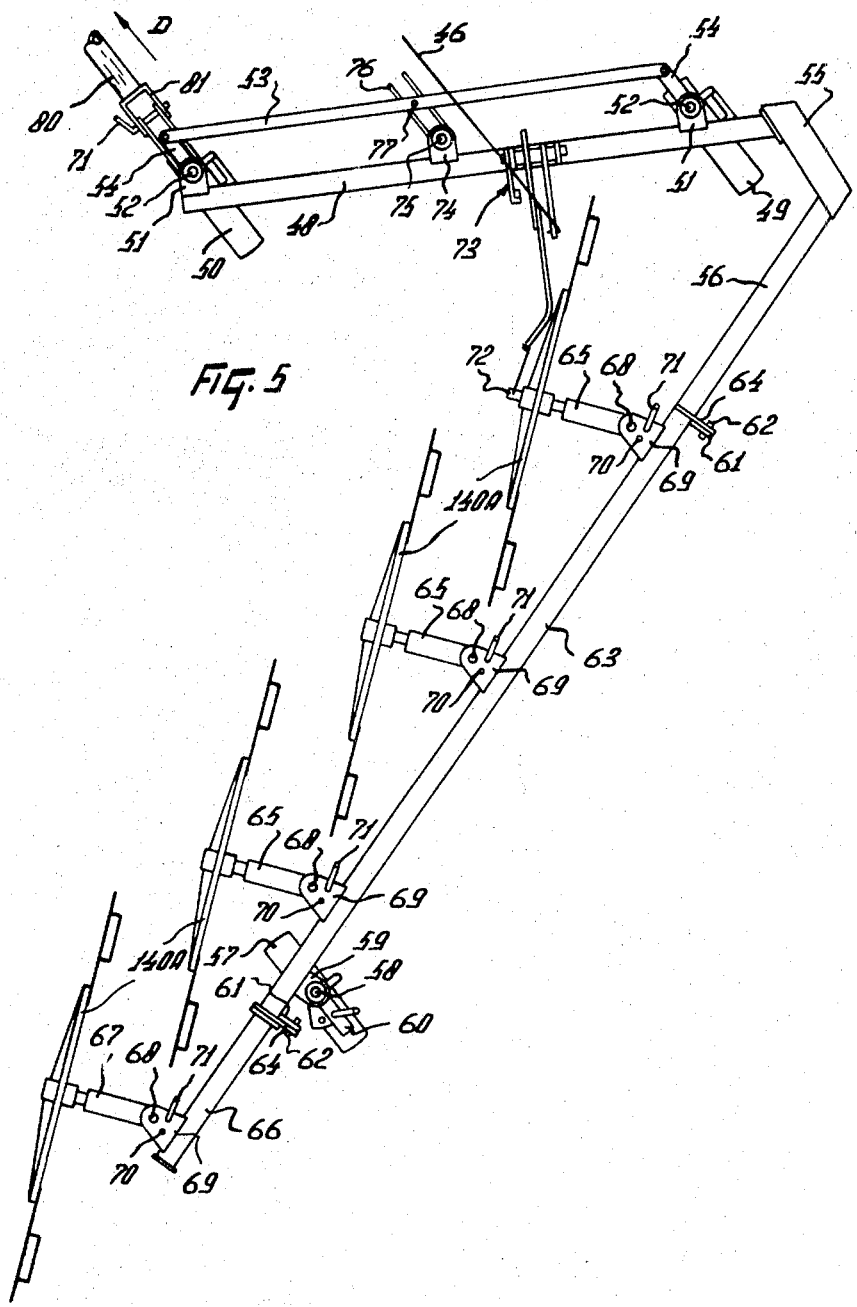

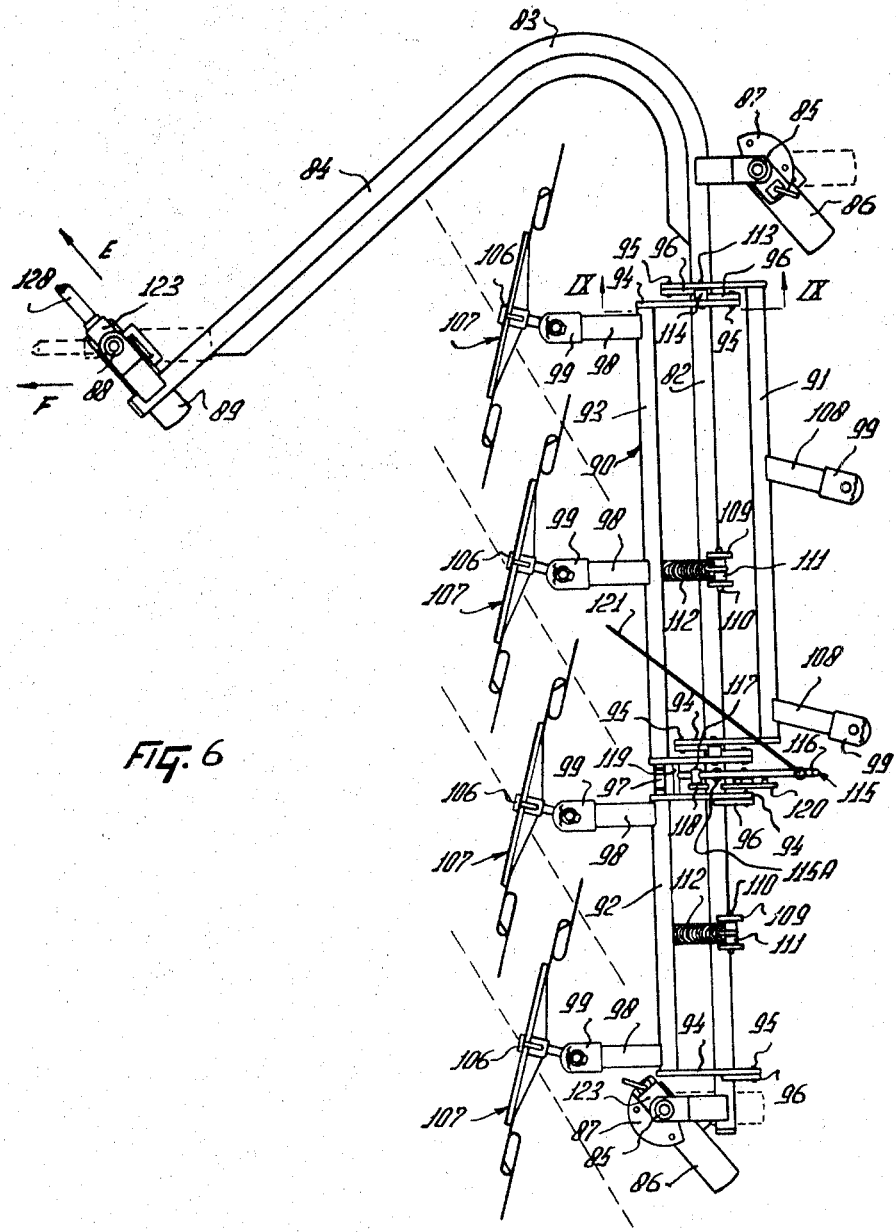

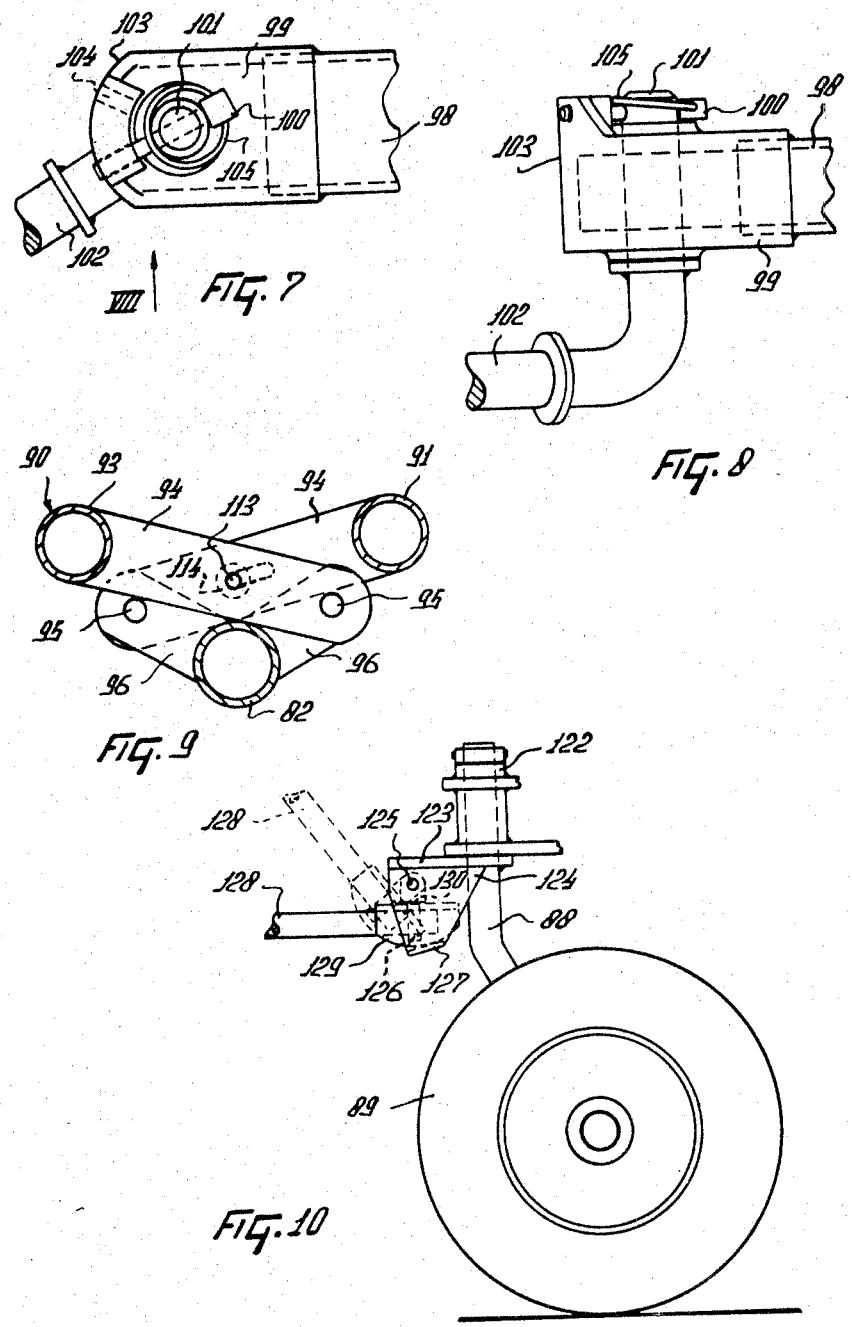

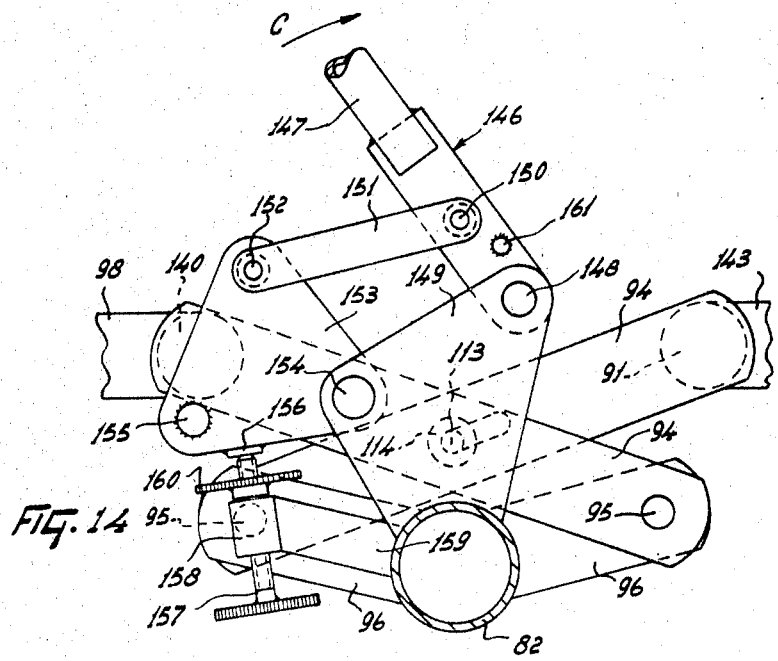
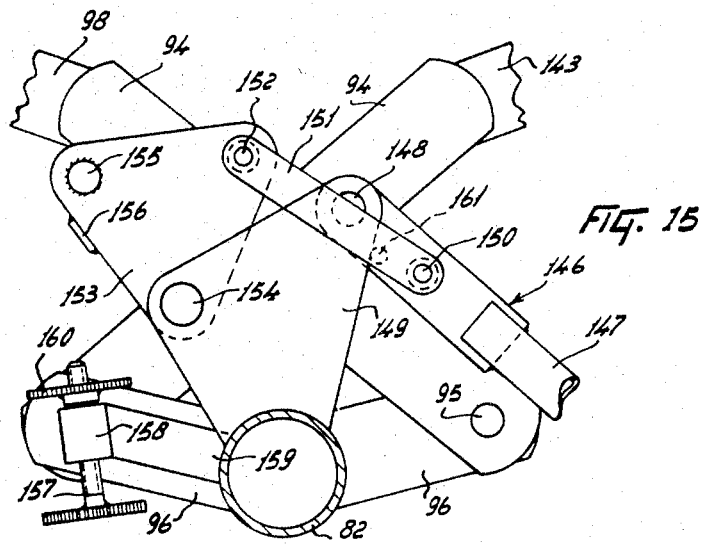

3,438,185
ROTARY WHEEL RAKING DEVICE
Cornelis van der Lely, 7 Bruschenrain,
Zug, Switzerland
Filed Feb. 2, 1966, Ser. No. 524,387
Claims priority, application Netherlands, Feb. 22, 1965,
6502169; Apr. 29, 1965, 6505457; Nov. 29, 1965,
6515446; Dec. 13, 1965, 6516161
Int. Cl. A01d 77/06, 81/00
U.S. Cl. 56—377                            21 Claims

ABSTRACT OF THE DISCLOSURE

An implement for displacing crop including a frame supported on wheels. One or more frame beams carrying rake wheels can be displaced with a lifting mechanism relative to another frame beam. The rake wheels are located in front of their supporting frame beam during operation.

---

This invention relates to agricultural implements of the kind comprising at least one working member whose vertical level is adjustable and a lifting mechanism for said member, the lifting mechanism including a lever turnable about a substantially horizontal axis.

An object of the invention is the provision of an improved lifting mechanism for parts of raking and other agricultural implements.

According to the invention, there is provided an implement of the kind set forth, wherein the lever is arranged to co-operate with a catch-member turnable about said axis, the catch-member being coupled to the working member in such a way that it tends to be turned about the axis in a first direction by the weight of the latter member, and wherein a pawl is provided for co-operation with teeth carried by the catch-member to maintain the working member in a raised position and a decoupling element is provided that is arranged to disengage said pawl from said teeth upon turning said lever in a direction opposite to the first direction, the decoupling element being pivotally mounted on the lever.

Figure 11:
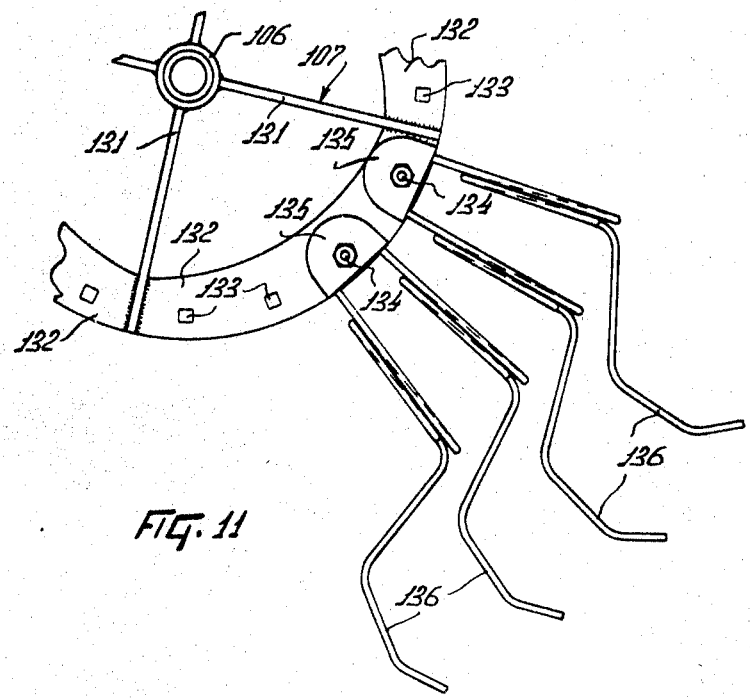
Figure 12:
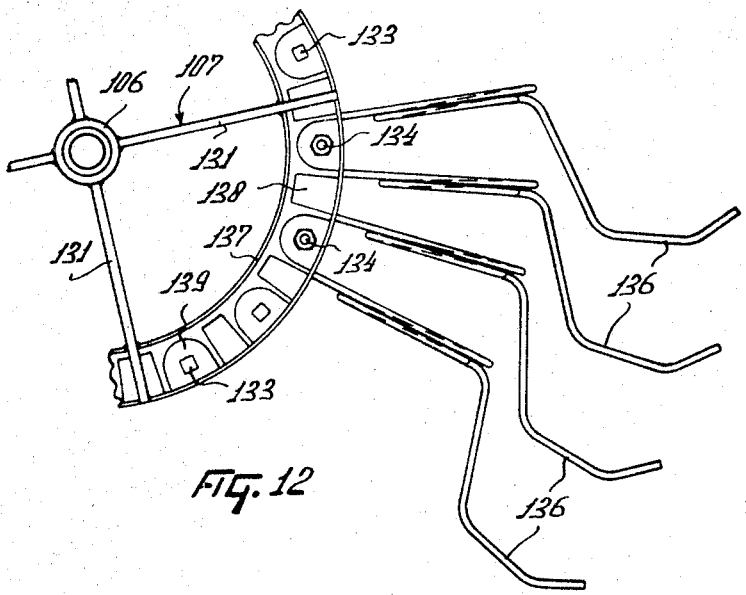
Figure 13:
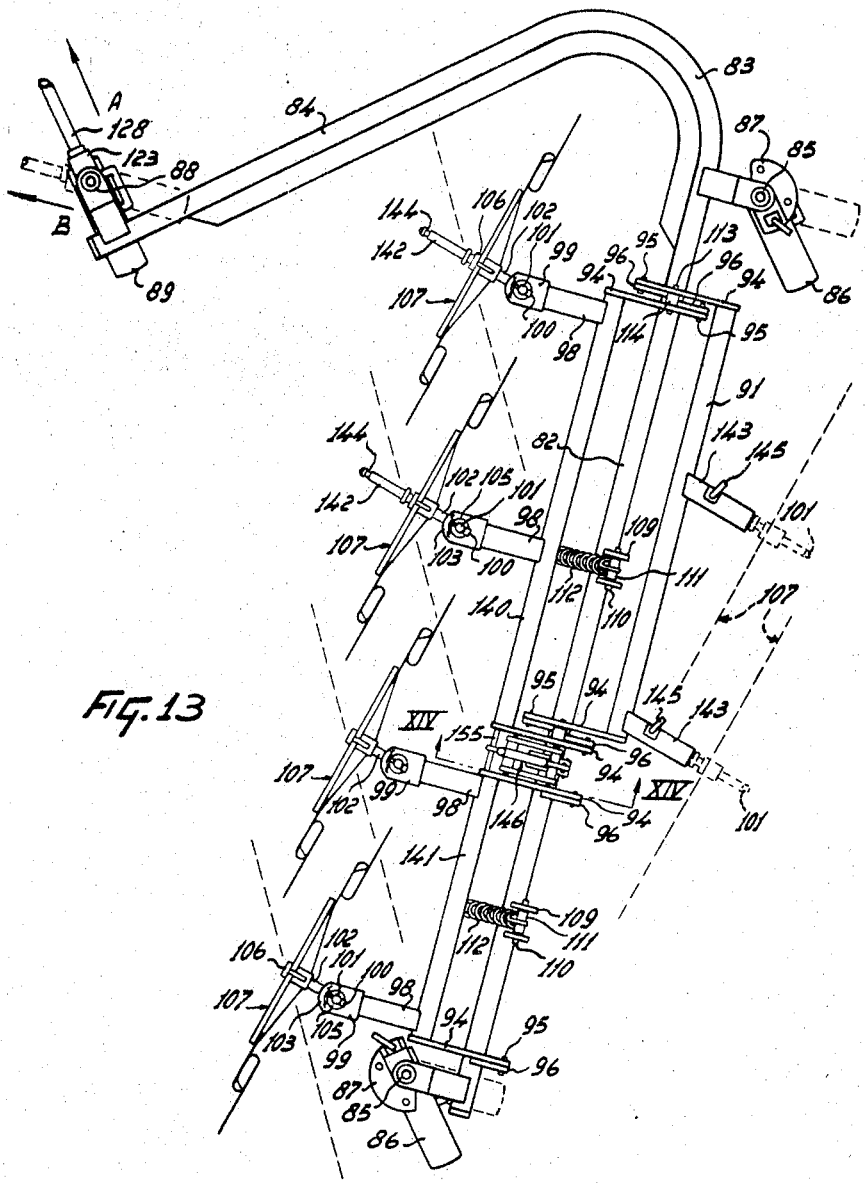

For a better understanding of the invention, and to show how the same may be carried into effect, reference will now be made, by way of example, to the accompanying drawings, in which:

FIGURE 1 is a plan view of a raking implement in accordance with the invention,

FIGURE 2 is a section, to an enlarged scale, taken on the line II—II of FIGURE 1, FIGURE 3 is a view as seen in the direction indicated by the arrow III of FIGURE 2, FIGURE 4 is a plan view, corresponding to FIGURE 1, and showing an alternative form of raking implement in accordance with the invention occupying a position suitable for use as a side-delivery rake, FIGURE 5 corresponds to FIGURE 4 but shows the implement arranged for use as a tedder, FIGURE 6 is a plan view of a third form of raking implement in accordance with the invention, FIGURE 7 is a scrap view, to an enlarged scale, showing parts of the mounting of one of the rake wheels of the implement of FIGURE 6, FIGURE 8 is a view as seen in the direction indicated by the arrow VIII of FIGURE 7, FIGURE 9 is a section, to an enlarged scale, taken on the line IX—IX of FIGURE 6, FIGURE 10 is a scrap elevation, to an enlarged scale, showing the form of connection of the draw-bar of the implement of FIGURE 6, FIGURE 11 is an elevation, to an enlarged scale, illustrating part of a rake wheel suitable for use with the implement of FIGURE 6, and FIGURE 12 corresponds to FIGURE 11 but shows an alternative form of rake wheel, FIGURE 13 is a plan view of a fourth form of a raking implement in accordance with the invention, FIGURE 14 is an elevation taken on the line XIV—XIV in FIGURE 13, FIGURE 15 is an elevation taken on the line XV—XV in FIGURE 14, the supports being lifted and the lifting device being locked in position.

Referring to FIGURES 1 to 3 of the drawings, the agricultural implement which is illustrated is a side-delivery rake having a frame beam 1 to one end of which a castor ground wheel 2 is connected. A further castor ground wheel 3 is connected to the frame beam 1 at a location towards the end thereof remote from the wheel 2. The end of the beam 1 adjacent the ground wheel 3 is secured to a block 4 to which is also fastened one end of a further frame beam 5. A ground wheel 6, which is not a castor wheel, is connected to the frame beam 5 towards the end thereof remote from the block 4.

The frame beam 5 is provided with two projecting lugs 7 to which two further lugs 10 are pivotally connected by a pair of aligned horizontal pivot pins 8 that extend substantially parallel to the frame beam 5. The lugs 10 are mounted at opposite ends of a frame beam 9 that lies over and above a major portion of the frame beam 5. The end of the frame beam 9 remote from the block 4 has a relatively parallel extension beam 12 releasably fastened to it. The frame beam 9 carries four relatively parallel rake wheel supports 11 and the extension beam 12 carries a similar parallel support 13, the support 13 being located adjacent the extreme rear end, relative to the intended direction of operative travel of the implement, of the extension beam 12. Each of the five supports 11 and 13 has a corresponding rake wheel 14 rotatably mounted thereon and it will be noted that the leading support 11, relative to said direction, has an extension 15 that lies in front of the corresponding rake wheel 14. The extension 15 is connected by a chain 16 (FIGURE 2) to a lifting mechanism which is generally indicated by the reference numeral 17 and which is mounted on the frame beam 1.

The lifting mechanism 17 can be seen in detail in FIGURES 2 and 3 of the drawings from which it will be seen that two parallel vertical plates 19 and 20 are secured to the frame beam 1 in relatively spaced relationship and so as to project upwardly therefrom. A horizontal shaft 21 is rotatably journalled in the plates 19 and 20 so as to extend parallel to the frame beam 1. Two adjoining sleeves 22 and 23 are independently turnably mounted on that portion of the shaft 21 which lies between the two plates 19 and 20. A lever 24 is fastened to the sleeve 22, so that said sleeve affords the fulcrum of the lever, and a plate 25 is fastened to the sleeve 23. The sleeve 22 is surrounded by several turns of a coil spring 18 one end of which makes hooking engagement with the plate 20 and the other end of which bears against a pin 26 that projects perpendicularly from one side of the lever 24. The coil spring 18 is arranged in such a way that it tends to turn the lever 24 about the shaft 21 in the direction indicated by the arrow A in FIGURE 2 of the drawings. However, such turning movement is prevented by a stop 27 that projects from the plate 20 in the path of the portion of the lever 24 that is located below the shaft 21. The plate 25 is provided with a large laterally projecting lug 28 the free end of which is located closely adjacent to one edge of the portion of the lever 24 that has just been mentioned when the various parts occupy the positions illustrated in FIGURES 2 and 3 of the drawings.

A pawl 30 is turnably mounted on a pivot pin 29 that is carried by the plate 19 so as to extend parallel to the shaft 21. A helical tension spring 32 is stretched between a finger 31 mounted on the pawl 30 and a pin 33 mounted on the plate 19 so that the pawl 30 tends to be turned about the pivot pin 29 in a clockwise direction as seen in FIGURE 2 of the drawings. The tip of the pawl 30 makes engagement with a row of teeth 34 formed along a lower edge region of the plate 25.

A shaft 35 that extends parallel to the shaft 21 is fastened to the lowermost end of the lever 24 and has a plate 36 turnably mounted on it. A coil spring 37 is also wound around the shaft 35 and has one end in hooking engagement with the lever 24 and its opposite end in abutting engagement with an edge of the plate 36. The coil spring 37 is arranged in such a way that it tends to turn the plate 36 about the shaft 35 in the direction indicated by the arrow B in FIGURE 2 of the drawings. However, this turning movement is barred by a stop lug 38 which projects from one side of the lever 24 in the path of the plate 36 so that said plate cannot turn around the shaft 35 in the direction B beyond the position illustrated in FIGURE 2. A pin 39 projects from one side of the pawl 30 between the tip of said pawl and its pivot pin 29, said pin 39 bearing against one edge of the plate 36.

An arm 41 of L-shaped cross-section has one of its limbs secured to the plate 25 by three bolts 40, the end of said arm which is remote from the plate 25 being fastened to the upper end of the aforementioned chain 16. A second arm 42 is turnably mounted on that end of the shaft 21 which projects to the side of the plate 19 that is remote from the plate 20, the arm 42 carrying a stop 43 adapted to co-operate with the plate 25. The arm 42 is formed with a slot 44 through which is entered a pin 45 that projects perpendicularly from the side of the plate 19 that is remote from the plate 20. The slot 44 is of curved formation, its center of curvature coinciding with the longitudinal axis of the shaft 21, and it will be appreciated that the co-operation of the slot 44 and pin 45 ensures that the arm 42 can only turn about the shaft 21 through a relatively small angle.

When the raking implement that has been described is in use, lowermost regions of its rake wheels 14 are in contact with the ground and the various parts of the lifting mechanism 17 occupy the positions shown in FIGURES 2 and 3 of the drawings. At the end of a raking operation, or temporarily during the course of a raking operation, the user of the implement may wish to raise the rake wheels 14 clear of contact with the ground so that the implement will thereafter be readily manoeuvrable. This can be done with the aid of a rope, cable or the like 46 that projects forwardly of the implement to a location adjacent the driving seat or the like of an agricultural tractor or other vehicle employed to propel the implement. In this connection, it will be noted that the mounting of the castor ground wheel 3 has a draw-bar 47 pivotally connected to it, the leading end of said draw-bar being adapted for connection to the tow-bar of said tractor or other vehicle. The implement end of the rope, cable or the like 46 is fastened to the uppermost end of the lever 24 and, upon the user of the implement pulling said rope, cable or the like 46, the lever 24 is turned about the shaft 21 in a direction opposite to the direction A against the opposition of the coil spring 18. The plate 25, which affords a catch plate for the rake wheels 14, is also turned in a direction opposite to the direction A by the abutment of the lever 24 against the large lug 28. During the first few degrees of turning movement of the lever 24 about the shaft 21, the lowermost edge (in FIGURE 2) of the plate 36 (which is pivotally mounted on the shaft 35 carried by the lever 24) slides along the pin 39 thus causing the pawl 30 to be turned in an anticlockwise direction about the pivot pin 29 against the action of the spring 32 to bring the tip of the pawl 30 clear of engagement with the ratchet teeth 34. The plate 36 thus affords a decoupling element for the ratchet 30. Continued turning movement of the lever 24 about the shaft 21 in a direction opposite to the direction A brings the lowermost corner (in FIGURE 2) of the plate 36 past the pin 39 so that the tip of the pawl 30 is thereafter immediately able to re-engage the ratchet teeth 34. The pawl 30 engages successive ones of said teeth until the arm 41 comes into abutting engagement with the stop 43 at which time the pawl 30 makes engagement with the end tooth 34 of the row. It will be recalled that the stop 43 is not a rigid stop and that the slot 44 and pin 45, in fact, determine the extreme uppermost setting to which the arm 41 can be brought. When the arm 41 is in contact with the stop 43, the frame beam 9 will have been turned upwardly about the aligned pivot pins 8 to a sufficient extent to bring the rake wheels 14 completely clear of contact with the ground. When this position is reached, the operator of the implement releases the rope, cable or the like 46 so that the coil spring 18 returns the lever 24 to the position shown in FIGURES 2 and 3 of the drawings. However, the plate 36 does not uncouple the pawl 30 during this return movement since said plate can turn about the shaft 35 against the action of the coil spring 37 in a direction opposite to the direction B to allow its lowermost (in FIGURE 2) corner to slide past the pin 39 without having to displace that pin downwardly. After said corner has passed the pin 39, the coil spring 37 returns the plate 36 in the direction B to the position shown in FIGURE 2 in which the plate abuts against the stop lug 38.

When the operator of the implement wishes to lower the rake wheels 14 from their raised position, he pulls the rope, cable, or the like 46 a short distance sufficient to turn the lever 24 through the small angle about the shaft 21 which will cause the plate 36 to disengage the pawl 30 from the ratchet teeth 34. The rake wheels 14 will then drop under gravity carrying the arm 41 and plate 25 back to the position which can be seen best in FIGURE 2 of the drawings. As soon as the operator releases the rope, cable or the like 46, the coil spring 18 returns the lever 24 to the position illustrated in FIGURE 2 so that the pawl 30 can re-engage the teeth 34.

The raising of the rake wheels 14 which has been described can be carried out in one single movement or, if preferred, step-by-step using the successive ratchet teeth 34. It will be noted that the pawl 30 can be brought into engagement with intermediate ones of the ratchet teeth 34 to maintain the rake wheels 14 in a partially raised position in which the pressure by which they contact the ground surface is reduced.

The agricultural implement which is shown in FIGURES 4 and 5 of the drawings is a raking implement for laterally displacing cut crop lying on the ground. The implement has a frame beam 48 that extends transverse to the intended direction of operative travel of the implement that is indicated by the arrow C in FIGURE 4 of the drawings and by the arrow D in FIGURE 5 of the drawings. A castor ground wheel 50 is connected to the frame beam 48 at one of its ends and a similar castor ground wheel 49 is connected to the same frame beam at a location towards the relatively opposite end thereof. The planes of rotation of both the castor ground wheels 49 and 50 are angularly displaceable about corresponding vertical axes afforded by vertical shafts 52 that are journalled in vertical bearings 51 fastened to the frame beam 48 by brackets. Strip-shaped arms 54 project forwardly of the implement from the two shafts 52, their leading ends being pivotally interconnected by a track rod 53 that extends in front of, and substantially parallel to, the frame beam 48.

The end of the frame beam 48 which is adjacent to the ground wheel 49 is fastened to a block 55 to which is also secured one end of a frame beam 56. The frame beam 56 is inclined to both the directions C and D at angles differing from 90°. A ground wheel 57, which is not a castor wheel, is connected to the frame beam 56 adjacent the end thereof remote from the block 55. The plane of rotation of the ground wheel 57 is angularly adjustable about a vertical axis afforded by a vertical shaft 58 journalled in a vertical bearing 59 secured to the frame beam 56 with the aid of a bracket. A locking member 60 of simple known construction is provided to enable the plane of rotation of the ground wheel 59 to be retained in either one of two different angular settings relative to the frame of the implement.

The frame beam 56 carries two lugs 61 and these lugs are pivotally connected to two further lugs 64 by a pair of horizontally aligned pivot pins 62. The lugs 64 are mounted at opposite ends of a frame beam 63 which is disposed over and above a major portion of the frame beam 56. An extension beam 66 is releasably secured to the end of the frame beam 63 closest to the ground wheel 57 so as to extend in coaxial relationship with the frame beam 63. Three straight rake wheel supporting arms 65 that all extend approximately horizontally are respectively connected to pairs of lugs 69 projecting from the frame beam 66 with the aid of approximately vertical pivot pins 68. As can be seen in the drawings, the lugs 69 are formed with holes 70 and locking pins 71 are provided for entry through chosen holes 70 and corresponding single holes formed in the arms 65 to retain each of said arms in either one of two different angular settings about the corresponding pivot pin 68. The extension beam 66 has a rake wheel supporting arm 67 pivotally connected to it in an identical manner to that which has just been described in respect of the three arms 65. Four rake wheels 140A are rotatably mounted at the ends of the supporting arms 65 and 67 that are remote from the beams 63 and 66.

The leading rake wheel supporting arm 65 is provided with an extension 72 that projects to the side of the corresponding rake wheel 140A that is remote from the beam 63. The extension 72 is flexibly connected to a lifting mechanism 73 that may be of similar construction and arrangement to the previously described lifting mechanism 17. At a point midway between the brackets supporting the vertical bearings 51, the frame beam 48 is provided with a pair of forwardly projecting horizontal lugs 74 to which the base of a forked bracket 76 is pivotally connected with the aid of a vertical pin 75. The limbs of the bracket 76 are also turnably connected to a central location of the track rod 53 by a vertical pivot pin 77. The free ends of the limbs of the forked bracket 76 are formed with a pair of horizontally aligned holes to which a forked bracket 79 at one end of a draw-bar 80 can be pivotally, and releasably, connected with the aid of a removable horizontal pin 78. The base of a forked bracket 81 that is generally similar to the forked bracket 76 is secured to the vertical shaft 52 that affords part of the mounting of the castor ground wheel 50. The free ends of the limbs of the forked bracket 81 are formed with a pair of horizontally aligned holes and the draw-bar 80 can be removed from its connection to the bracket 76, as shown in FIGURE 4 of the drawings, and pivotally connected to the bracket 81, with the aid of the pin 78, as shown in FIGURE 5 of the drawings. The brackets 76 and 81 thus afford first and second coupling points for the draw-bar 80.

When it is desired to use the implement which has just been described as a side-delivery rake, it is arranged as shown in FIGURE 4 of the drawings. In this arrangement, the frame beam 63 is located behind the row of overlapping rake wheels 140A and at approximately the same level as the hubs of those rake wheels. The leading end of the draw-bar 80 is connected to an agricultural tractor or other propelling vehicle and the implement is drawn over the ground in the direction C. Each rake wheel 140 delivers crop which it displaces to the following rake wheel of the row, relative to the direction C, so that all the displaced crop is collected as a single swath or windrow to the left of the path of travel of the implement. The raking width of the implement can be reduced when desired by temporarily removing the extension beam 66 and the rake wheel 140A which it carries. The locking member 60 of the ground wheel 57 is arranged in such a way that the plane of rotation of that ground wheel extends substantially parallel to the direction C.

When the implement is to be used for tedding, it is arranged as shown in FIGURE 5 of the drawings and is drawn over the ground in the direction indicated by the arrow D. As will be seen by a comparison between FIGURE 5 and FIGURE 4 of the drawings, each of the rake wheel supporting arms 65 and 67 has been turned about the corresponding pivot pin 68 to bring the single holes in said arms into register with the alternative pairs of holes 70, the locking pins 71 being employed to maintain the new settings. In addition, the angular setting of the plane of rotation of the ground wheel 57 about the axis of the vertical shaft 58 has been changed with the aid of the locking member 60 so that said plane of rotation extends substantially parallel to the direction D. Each rake wheel laterally displaces crop independently of its fellows when the implement operates as a tedder.

When the implement is to be transported from one place to another without performing any working operation, it can be brought to a transport position by pulling the rope, cable or the like 46 to cause the lifting mechanism 73 to raise the rake wheels 140A clear of contact with the ground, said rake wheels, their supporting arms and the frame beam 63 being turned upwardly about the axis afforded by the aligned pivot pins 62. The transport position which has just been described can be reached from either of the working positions shown in FIGURE 4 or 5 of the drawings but it will be seen from the drawings that, if the implement is to pass through gateways and/or along public roads or the like, it is drawn in the direction C of FIGURE 4.

The agricultural implement which is illustrated in FIGURES 6 to 10 of the drawings is a raking implement having two straight frame beams 82 and 84 that are integrally interconnected by a curved portion 83, said portion subtending an angle of approximately 135° at its own center of curvature. Castor ground wheels 86 are mounted adjacent the opposite ends of the frame beam 82, the planes of rotation of said ground wheels being angularly adjustable about vertical axes afforded by corresponding vertical shafts 85. Two simple known locking members 87 are provided to enable the planes of rotation of the two ground wheels 86 to be retained in chosen ones of three different angular settings about the axes afforded by the shafts 85. A third castor ground wheel 89 is mounted at the end of the frame beam 84 remote from the curved portion 83. The plane of rotation of this ground wheel 89 is angularly adjustable about an axis afforded by a vertical shaft 88.

Two tabular supports 90 and 91 are arranged on opposite sides of the frame beam 82 so as to extend parallel to that beam. As can be seen in FIGURE 6 of the drawings, the support 90 is located at the side of the beam 82 closest to the ground wheel 89 while the support 91 is located at the relatively opposite side of said beam. Both supports are disposed between the locations of the two castor ground wheels 86. The support which is generally indicated by the reference numeral 90 is formed in two portions 92 and 93, each portion having two similarly projecting arms 94 fastened to its opposite ends. The support 91 is also carried by two projecting arms 94 located at its opposite ends and, as can be seen best in FIGURE 9 of the drawings, the ends of the arms 94 remote from the parts 91, 92 and 93 are turnably connected to lugs 96 that are inclined upwardly from the frame beam 82 by horizontal pivot pins 95. The adjacent ends of the support portions 92 and 93 are interconnected by a strip 97 (FIGURE 6). It will be noted that the ends of the two supports 90 and 91 that are closest to the curved portion 83 of the frame are both spaced from that portion by substantially the same distance. The overall length of the support 90 is, however, much greater than the overall length of the support 91.

Four rake wheel supporting arms 98 project perpendicularly from the support 90 in a direction away from the frame beam 82. The four arms 98 are equidistantly spaced along the support 90, there are two of them carried by each of the two portions 92 and 93 and two of them are located at relatively opposite ends of the support 90. The free end of each supporting arm 98 carries an approximately vertical bearing 99 in which the bent-over vertical end portion 101 (FIGURES 7 and 8) of a substantially horizontal shaft 102 is entered. The upper extremity of each end portion 101 is formed with a transverse bore through which a pin 100 is entered to prevent axial displacement of said portion 101 in the corresponding bearing 99 to any appreciable extent. The pins 100 also serve to retain the shafts 102 in chosen angular settings about the substantially vertical axes afforded by the bearings 99. The upper side of each bearing 99 is formed with an arcuate rim 103 a central region of which is thickened to form a block through which two holes 104 (FIGURE 7) are formed. The two holes 104 both extend radially of the vertical axis afforded by the corresponding bearing 99 and are located at the same level as the bore which receives the pin 100. Accordingly, as will be evident from the drawings, each shaft 102 can be placed in either one of two different angular settings about the axis afforded by the corresponding bearing 99 and can be retained in either setting by entering the corresponding pin 100 through the bore in the end portion 101 of the shaft and the appropriate hole 104. The head of each pin 100 has the opposite ends of a broken ring 105 of resilient formation pivotally engaged therewith. The opposite ends of the broken ring 105 are pivotally connected to the opposite sides of the head of the pin 100 in non-aligned manner in such a way that the ring 105 tends to maintain the position illustrated in which, it will be noted, it prevents withdrawal of the pin 100 by abutting against the end portion 101 of the shaft 102. The rings 105 can, of course, be turned manually relative to the heads of the pins 100 against resilient opposition without difficulty when it is required to withdraw the pins 100. The end of each shaft 102 which is remote from the corresponding bearing 99 has the hub 106 (FIGURES 6, 11 and 12) of a corresponding rake wheel 107 rotatably mounted thereon.

The tubular support 91 carries two projecting rake wheel supporting arms 108 the free ends of which are provided with vertical bearings 99. It will be noted that, while the arms 108 project away from the side of the support 91 that is remote from the frame beam 82, they are not perpendicular to the support 91 but are gently inclined towards the end of the frame beam 82 that is remote from the curved frame portion 83. When required, the bent-over end portions 101 of the previously described rake-wheel supporting shafts 102 can be connected to the vertical bearings 99 carried by the arms 108.

A pair of upstanding lugs 109 is provided on the frame beam 82 alongside a central region of each of the two support portions 92 and 93. The uppermost ends of the two pairs of lugs 109 support horizontal pins 110 and sleeves 111 surround the pins 110 between each pair of lugs 109. Two helical tension springs 112 extend between the sleeves 111 and lugs (not visible) carried by the aforementioned central regions of the two support portions 92 and 93. The aforementioned arms 94 corresponding to the support 91 and the portion 93 of the support 90 are formed approximately centrally with slots and each adjacent pair of said arms is interconnected by a corresponding horizontal pin 113 (FIGURES 6 and 9) that is entered through said slots. Each pin 113 is surrounded between the corresponding pair of arms 94 by a sleeve 114. The pins 113 ensure that, when one of the supports 90 or 91 is turned upwardly relative to the frame beam 82, the other support is turned upwardly in a similar manner.

A lifting mechanism 115 is arranged on the frame of the implement at a position which is such that it is principally located between the arms 94 carried at the neighbouring ends of the two support portions 92 and 93. The lifting mechanism 115 is arranged to enable both the supports 90 and 91 to be tilted upwardly simultaneously about the horizontal pivot pins 95. The lifting mechanism includes a lever 116 that is turnable about a horizontal shaft 117 fastened to a lug 118 carried by the frame beam 82. The lowermost end of the lever 116 carries a relatively perpendicular bar or stop 119 arranged to co-operate, for lifting purposes, with lower edges of the two arms 94 that are located at the adjacent ends of the support portions 92 and 93. The lever 116 carries a locking member (not shown in detail) arranged to co-operate with an arm 120 fastened to the frame beam 82. One end of a rope, cable or the like 121 is secured to the uppermost end of the lever 116 and a tension spring 115A extends between the lever 115 and the frame beam 82 so as to tend to turn the bar or stop 119 upwardly about the horizontal shaft 117. The rope, cable or the like 121 is passed through eyes or other guides (not shown) mounted on the frame of the implement and the end thereof that is remote from the locking mechanism 115 is positioned adjacent the driving seat of an agricultural tractor or other vehicle which is used to propel the implement over the ground.

The vertical shaft 88 about the longitudinal axis of which the plane of rotation of the ground wheel 89 is angularly adjustable is journalled in a vertical bearing 122 (FIGURE 10) supported by the end of the frame beam 84 remote from the curved portion 83. The shaft 88 has a horizontal plate 123 secured to it, the lower side of said plate carrying two further relatively spaced but parallel vertical plates 124. A horizontal pivot pin 125 extends between the plates 124 and a relatively perpendicular stub shaft 126 is turnably mounted on the pin 125 in such a way that it normally projects downwardly therefrom. The lowermost edges of the two plates 124 are interconnected by a relatively perpendicular strip 127 and one end of a draw-bar 128 is releasably connected to the stub shaft 126 between the plates 124. Said end of the draw-bar 128 has a thickened portion 129 through which a bore 130 is formed. The stub shaft 126 can be entered in the bore 130 by turning the stub shaft about the pivot pin 125 to the portion shown in broken lines in FIGURE 10. The draw-bar 128 is then turned downwardly about the pin 125 to the substantially horizontal position shown in full lines in which position the portion 129 of the draw-bar is surrounded by a "box" afforded by the parts 123, 124 and 127, the part 127 preventing withdrawal of the stub shaft 126 from the bore 130. As can be seen in FIGURE 6 of the drawings, a similar mounting for the draw-bar 128 is carried by the vertical shaft 85 associated with the ground wheel 86 located at the end of the frame beam 82 remote from the curved portion 83.

FIGURE 11 shows further details of one of the rake wheels 107 of the implement of FIGURES 6 to 10. The hub 106 of the rake wheel has four radial spokes 131 that are equiangularly spaced from one another around said hub. The free ends of the spokes 131 have four curved segments 132 welded to them to form a circle, each segment being formed with four square holes 133 through which bolts 134 are entered to secure the common roots of integral pairs of tines 136 to the segments by means of clamping plates 135. This arrangement has the advantage that the identical segments 132 can be formed rapidly, together with the square holes 133 therein, by a stamping or punching process.

An alternative construction of the rake wheels 107 is illustrated in FIGURE 12 of the drawings. In this case, each single segment 132 is replaced by a pair of superimposed segments 137, the segments 137 of each pair being formed with strengthening bulges 138 between which clamping areas 139 are provided. As can be seen in FIGURE 12, the square holes 133 are formed approximately centrally of the clamping areas 139 of the superimposed segments 137 while the common roots of the integral pairs of tines 136 are entered between pairs of clamping areas 139 which areas are drawn together into clamping engagement with said roots by the bolts 134 entered through the square holes 133.

The raking implement which has been described with reference to FIGURES 6 to 12 of the drawings has four rake wheels 107. When these rake wheels are arranged as shown in full lines in FIGURE 6 of the drawings with the ground wheels 86 and 89 and the draw-bar 128 also arranged as shown in full lines in the same figure, then, upon drawing the implement over the ground in the direction indicated by the arrow E, the implement functions as a side-delivery rake so that all the displaced crop is formed into a single swath or windrow to the left of the rearmost rake wheel 107 of the row of rake wheels relative to the direction E. Upon bringing the rake wheels 107 to the angular settings shown in broken lines in FIGURE 6 in the manner previously described with reference to FIGURES 7 and 8 of the drawings and also bringing the angular settings of the ground wheels 86 and 89 and the draw-bar 128 to the positions shown in broken lines in FIGURE 6, the implement will function as a tedder when it is drawn over the ground in the direction indicated by the arrow F. Thus, each rake wheel 107 will displace crop laterally to the left relative to the direction F independently of its fellows.

A third working position, in which the implement functions as a swath turner, can be reached by removing the rake wheels 107 and their shafts 102 from the two vertical bearings 99 that are carried by the support portion 93, subsequently reconnecting said rake wheels and shafts to the vertical bearings 99 carried by the support 91. After rearrangement of the ground wheels and draw-bar for travel in the direction E, the implement will operate as a swath turner, each pair of rake wheels 107 acting in unison but independently of the other pair.

When the implement is in use, the tension springs 112 resiliently connect the rake wheels 107 to the frame beam 82 in such a way that said wheels do not bear against the ground surface with their full weight. The locking mechanism 115 occupies a position at such times in which the bar or stop 119 is lowered so that it has no effect upon the supports 90 and 91. The spring 115A is thus fully, or substantially fully, tensed by the lever 116 which is prevented from turning to release the tension by the locking member associated with the arm 120. When it is desired to raise the rake wheels 107 clear of the ground for transport, readjustment or manoeuvring purposes, then the user of the implement gives a short gentle pull on the rope, cable or the like 121 which releases the locking member that has just been mentioned allowing the tension spring 115A to contract and turn the lever 116 carrying the bar or stop 119 in a direction such that said bar or stop moves upwardly into supporting engagement with the associated pair of arms 94. This upward pressure, in conjunction with the action of the springs 112, is sufficient to lift the rake wheels 107 completely clear of contact with the ground. When it is desired to bring the rake wheels 107 back into contact with the ground, the user of the implement gives a sustained pull on the rope, cable or the like 121 which is sufficient to turn the lever 116 back into the position in which the spring 115A is substantially fully tensed and in which the bar or stop 119 is inoperative. It will be appreciated that the construction of the lifting mechanism 115 may, for example, be basically similar to the construction of the lifting mechanism 17 which has previously been described in detail with reference to FIGURES 2 and 3 of the drawings. Other constructions may, however, be used if preferred.

When it is desired to transport the implement from one place to another without it performing any working operation, the locking member associated with the arm 120 is released to bring the spring 115A into action to raise the rake wheels 107 clear of contact with the ground. The planes of rotation of the two ground wheels 86 are arranged in settings in which said planes extend parallel to the frame beam 82, the quick release connection between the draw-bar 128 and its mounting at the rake wheel 89 is disengaged and said draw-bar 128 is quickly reengaged with the similar mounting associated with the ground wheel 86 located at the end of the frame beam 82 remote from the frame portion 83. The implement can then be drawn in a direction parallel to the length of the frame beam 82 in which position its path of travel is substantially reduced. The ground wheel 89 acts as a trailing free castor wheel under these conditions.

In FIGURES 13 and 14 parts corresponding with those of the preceding embodiment are designated by the same reference numerals. On one side of the frame beam 82, between the ground wheels 86, two aligned supports 140 and 141 extend parallel to the frame beam 82. The supports 140 and 141 are arranged like the support 91 on the other side of the frame beam 82. The support 140 and 141 are adapted to be swung in a direction of height relatively to each other and to the frame beam 82 about the shafts 95. The supports 140 and 91 extend approximately from the same point on the front side of the frame beam to the rear and have approximately the same length.

Each of the supports 140 and 141 is provided with spaced arms, extending at right angles to the support, said arms 98 being arranged so that the distances between the arms are equal and one arm is located near each end of the support 140 and 141. The connection of the rake wheels with the arms is quite identical to the preceding embodiment, so that further explanation may be dispensed with. From FIGURE 13 it will be apparent that the shaft 102 for the two foremost rake wheels is provided with a stub shaft 142, which is located on the other side of the rake wheel 107 than the stub shaft 101.

The support 91 on the other side of the frame beam 82 is provided with arms 143, which are arranged so that they extend slightly obliquely to the support 91 in the direction towards the rear side of the frame beam 82. The arms 143 are provided with a hole for accommodating the stub shaft 142. For locking purposes an uninterrupted groove 144 provided near the end of the stub shaft 142 is adapted to co-operate with a pin 145 to be inserted into the arm 143.

Near the center of the supports 140 and 141 the frame beam 82 is provided with spring structures corresponding with the spring structures for the supports 90 of the preceding embodiment.

Between the supports 94 by means of which the supports 140 and 91 are hinged to the frame beam there is provided the same pivotal joint as between the rods for the respective supports of the preceding embodiment.

Near the rear end of the supports 140 and 91, between the supports 94, a lifting device 146 is arranged at the proximal ends of the supports 140 and 141; with the aid of said device the supports 140 and 141 and the support 91 can be lifted simultaneously. The lifting device comprises a lever 147, pivotally arranged between the supports 94 by means of a shaft 148 and a plate 149 on the frame beam 82. Near the lower end of the lever 147 an arm 151 is pivotally arranged by means of a shaft 150. The other end of the arm 151 is pivotally coupled by means of a shaft 152 with the corner of a triangular plate 153. The second corner of the plate 153 is pivotally coupled by means of a shaft 154 with the plate 149. The remaining corner of the plate 153 is provided with a stop 155, which is adapted to co-operate with each of the supports 94 of a support 140 or 141 respectively. On the lower side the plate 153 is provided with a strip 156, which is adapted to co-operate with one end of a set screw 157, arranged in a sleeve 158 at one end of a support 159 on the frame beam 82. By means of a nut 160 the screw 157 can be fixed in a given position. The lever is provided with a stop 161, by means of which the lever bears on the plate 149 in its locked position.

In the device shown in FIGURES 13 to 15 the third working position of the device is obtained by removing the two rake wheels of the group arranged on the support 140, when the pin 100 has been removed, and by rearranging them by means of the stub shaft 142 and the pin 145 in the arms 143 of the support 91 on the other side of the frame beam.

The supports with the rake wheels can be lifted by means of the lifting device 146 by moving the lever 147 in the direction of the arrow C. The plate 153 is then also turned in said direction, while the stop 155 carries along the supports 94 of the supports 140 and 141. Upon a further turn the lever passes by a dead point, so that the assembly is locked in the position shown in FIGURE 15.

In the working position the supports bear by means of the strip 156 of the plate 153 on the set screw so that their downward movement is limited (see FIGURE 14). By means of the set screw said limitation can be adapted to various heights.

Although the invention has been described solely in relation to raking implements, it will be evident that the lifting mechanisms and other features could equally well be applied to parts of other agricultural implements, such as, for example, the plough bodies of ploughs, the outlet port masking plates of spreading implements for powdered and granular materials or the tines or discs of harrows, which it is required should be capable of being readily moved into and out of engagement with crop or the soil by an operator of the implement.

What I claim is:

1. An implement for the lateral displacement of crop lying on the ground comprising a frame supported on ground wheels, said frame including a first frame beam inclined to the intended direction of travel and a second frame beam extending substantially parallel to said first frame beam, pivot means connecting said second frame beam to said first frame beam, said second frame beam being adjustable with respect to said first frame beam about a pivot axis which extends substantially parallel to said first frame beam, a lifting mechanism mounted on said frame for adjusting said second frame beam, rake wheels connected to said second frame beam, said rake wheels being located in front of said first and second frame beams when viewed in the intended direction of travel.

2. An implement as claimed in claim 1, wherein the front end of said first frame beam is attached to one end of a third frame beam which extends transverse to the intended direction of travel, a draw bar being pivotally coupled with the free end of said third frame beam.

3. An implement as claimed in claim 2, wherein said frame is supported by three ground wheels, one ground wheel being located near each end of said first frame beam and the third ground wheel being arranged near the free end of said third frame beam, said third ground wheel being connected to said draw bar and being pivotable with respect to said frame about a vertical axis together with said draw bar.

4. An implement as claimed in claim 1, wherein said rake wheels are mounted on end portions of arms which are attached to said second frame beam, one of said arms having a prolongation which extends in front of the rake wheel mounted on said arm, said lifting mechanism being coupled with said prolongation.

5. An implement as claimed in claim 4, wherein said arms are displaceable about substantially vertical axes for changing the implement from a side delivery rake to a tedder.

6. An implement as claimed in claim 4, wherein said arms are substantially straight and extend approximately horizontally during travel, the other end portion of each arm remote from said second frame beam being turnable relative to said frame beam about a substantially vertical axis afforded by a pivot pin mounted in support lugs fastened to said second frame beam.

7. An implement for the lateral displacement of crop lying on the ground comprising a frame supported on ground wheels, said frame including a first frame beam inclined to the intended direction of travel and two further frame beams for supporting rake wheels located on relatively opposite sides of said frame beam when seen in plan view, said further frame beams extending substantially parallel to said first frame beam and each of said further frame beams being angularly displaceable by means of a lifting mechanism about a substantially horizontal axis with respect to said first frame beam, each of said axes extending substantially parallel to said first frame beam.

8. An implement as claimed in claim 7, wherein two corresponding ends of said further frame beams are both located perpendicularly opposite substantially the same point along said first frame beam.

9. An implement as claimed in claim 7, wherein one of said further frame beams is of greater length than the other.

10. An implement as claimed in claim 7, wherein at least one of said further frame beams is connected to said frame by a spring which resiliently supports said rake wheels.

11. An implement as claimed in claim 7, wherein each further frame beam has at least two arms, the free ends of said arms mounting rake wheels.

12. An implement as claimed in claim 11, wherein said rake wheels on at least one of said farther frame beams are angularly mounted on said arms.

13. An implement as claimed in claim 11, wherein the free end of an arm is provided with a substantially vertical bearing in which a shaft connected to a corresponding rake wheel axle is detachably lodged.

14. An implement as claimed in claim 13, wherein the rake wheels and their axles can be released from said arms by detaching said shafts from the substantially vertical bearings whereby two rake wheels can be removed from one of said further frame beams and transferred to another of said further frame beams to bring the implement from a position of use as a side-delivery rake to a position of use as a swath turner, at least some of said rake wheels being located at the opposite side of said first frame beam from the other rake wheels in the last-mentioned position.

15. An implement as claimed in claim 7, wherein a lifting mechanism is provided to raise both of said further frame beams simultaneously to bring the implement to a position suitable for non-operative transport.

16. An implement as claimed in claim 15, wherein said lifting mechanism is located adajcent the rear of one of said further frame beams relative to the intended direction of travel of the implement.

17. An implement as claimed in claim 16, wherein one of said further frame beams is longer than the other and the lifting mechanism is located adjacent the rear end of the shorter of said frame beams relative to the intended direction of travel of the implement.

18. An implement as claimed in claim 7, wherein said further frame beams are pivotally interconnected whereby an upward turning movement of one further frame beam results in a similar upward movement of the other further frame beam.

19. An implement as claimed in claim 7, wherein said rake wheels are each mounted on a shaft connected to said further frame beams and each shaft can be turned in a corresponding substantially vertical bearing without disengagement from that bearing to bring the implement from a position of use as a side-delivery rake to a position to use as a tedder.

20. An implement as claimed in claim 7, wherein the implement includes a draw-bar which can be alternatively coupled with the implement by a quick-release connection at the mounting of a ground wheel located at the front and at the mounting of a ground wheel located at the rear of the implement relative to the intended direction of travel.

21. An implement as claimed in claim 20, wherein each quick-release connection comprises a stub shaft turntable about a substantially horizontal axis, a hole in said draw-bar into which said stub shaft can be entered, whereby after entering said stub shaft in said hole and turning the draw-bar downwardly into a substantially horizontal position, said stub shaft and said surrounding portion of said draw-bar are entered in a box, the walls of said box retaining said draw-bar in said stub shaft.

References Cited

UNITED STATES PATENTS

| | | | |
|---|---|---|---|
| 2,840,977 | 7/1958 | Van Der Lely et al. | 56—377 |
| 2,861,414 | 11/1958 | Van Der Lely et al. | 56—377 |
| 2,901,880 | 9/1959 | Van Der Lely et al. | 56—377 |
| 2,922,270 | 1/1960 | Van Der Lely et al. | 56—377 |
| 2,955,407 | 10/1960 | Van Der Lely et al. | 56—377 |
| 2,966,773 | 1/1961 | Van Der Lely | 56—377 |
| 2,991,613 | 7/1961 | Breed | 56—377 |
| 3,031,834 | 5/1962 | Van Der Lely et al. | 56—366 |
| 3,069,833 | 12/1962 | Van Der Lely | 56—366 |

ALDRICH F. MEDBERY, *Primary Examiner.*

U.S. Cl. X.R.

56—366